(12) United States Patent
Menchero

(10) Patent No.: US 7,246,091 B1
(45) Date of Patent: Jul. 17, 2007

(54) METHOD AND SYSTEM FOR MULTI-PERIOD PERFORMANCE ATTRIBUTION

(75) Inventor: Jose Gabriel Menchero, San Francisco, CA (US)

(73) Assignee: Vestek Systems, Inc., San Francisco, CA (US)

( * ) Notice: Subject to any disclaimer, the term of this patent is extended or adjusted under 35 U.S.C. 154(b) by 903 days.

(21) Appl. No.: 09/698,693

(22) Filed: Oct. 27, 2000

Related U.S. Application Data

(63) Continuation-in-part of application No. 09/613,855, filed on Jul. 11, 2000.

(51) Int. Cl.
*G06Q 40/00* (2006.01)
(52) U.S. Cl. .............................. 705/36; 705/35; 705/37; 705/38; 705/39; 705/40
(58) Field of Classification Search ............. 705/35–40
See application file for complete search history.

(56) References Cited

U.S. PATENT DOCUMENTS

| | | | | |
|---|---|---|---|---|
| 5,761,442 | A | 6/1998 | Barr et al. .................. | 395/236 |
| 5,918,217 | A * | 6/1999 | Maggioncalda et al. ...... | 705/36 |
| 5,930,762 | A | 7/1999 | Masch ........................... | 705/7 |
| 6,021,397 | A | 2/2000 | Jones et al. .................... | 705/36 |
| 6,078,904 | A * | 6/2000 | Rebane ........................ | 705/36 |
| 6,175,824 | B1 | 1/2001 | Breitzman et al. ............ | 705/36 |
| 6,249,775 | B1 | 6/2001 | Freeman et al. .............. | 705/36 |

OTHER PUBLICATIONS

Carino, David, "Combining Attribution Effects Over Time," *The Journal of Performance Measurement*, Summer 1999, pp. 5-14.

Menchero, Jose G., "Fully Geometric Approach to Performance Attribution," *The Journal of Performance Measurement*, Winter 2000/2001, pp. 22-30.
Menchero, Jose G., "An Optimized Approach to Linking Attribution Effects Over Time," *The Journal of Performance Measurement*, Fall 2000, pp. 36-42.

* cited by examiner

*Primary Examiner*—Nga Nguyen
(74) *Attorney, Agent, or Firm*—Girard & Equitz LLP

(57) ABSTRACT

A method for arithmetic and geometric performance attribution which accurately links single-period attribution effects over multiple periods. The arithmetic attribution method optimally distributes the residual to yield a minimum-distortion residual-free arithmetic attribution system. The geometric attribution method defines the attribution effects in terms of ratios. The arithmetic method determines portfolio performance over multiple time periods as a sum of terms of form $(R_t - \overline{R}_t)(A + \alpha_t)$, where the coefficients $\alpha_t$ are defined as $$\alpha_1 = \left[ \frac{R - \overline{R} - A \sum_{k=1}^{T}(R_k - \overline{R}_k)}{\sum_{k=1}^{T}(R_k - \overline{R}_k)^2} \right](R_t - \overline{R}_t).$$

In preferred embodiments, the value of A is $$A = \frac{1}{T}\left[\frac{(R - \overline{R})}{(1+R)^{1/T} - (1+\overline{R})^{1/T}}\right],$$

where $R \neq \overline{R}$, or, for the special case of $R = \overline{R}$, $A = (1+R)^{(T-1)/T}$, where T is the number of time periods. In all embodiments, the inventive coefficient $(A + \alpha_t)$ have smaller (typically much smaller) standard deviation than conventional logarithmic coefficients, which reduces variation in the weights assigned to each time period relative to the other time

LOGARITHMIC COEFFICIENTS.
(AVERAGE LINKING COEFFICIENT, 12-MONTH PERIOD)

INVENTIVE COEFFICIENTS.
(AVERAGE LINKING COEFFICIENT, 12-MONTH PERIOD)

periods in the attribution calculation. In preferred embodiments, the geometric method determines portfolio relative performance over multiple time periods as $$\frac{1+R}{1+\overline{R}} = \prod_{t=1}^{T} \prod_{i=1}^{N} (1+I_{it}^G)(1+S_{it}^G),$$

where $$1 + I_{it}^G = \left(\frac{1+w_{it}r_{it}}{1+w_{it}\bar{r}_{it}}\right)\Gamma_t^I$$

is the geometric issue selection and $$1 + S_{it}^G = \left(\frac{1+w_{it}\bar{r}_{it}}{1+\overline{w}_{it}\bar{r}_{it}}\right)\left(\frac{1+\overline{w}_{it}\overline{R}_t}{1+w_{it}\overline{R}_t}\right)\Gamma_t^S$$

is the geometric sector selection. The attribution effects employed in preferred embodiments of the inventive geometric attribution method have more natural form than the conventional counterparts, and allow geometric attribution to be performed more accurately. Other aspects of the invention are a computer system programmed to perform any embodiment of the inventive method, and a computer readable medium which stores code for implementing any embodiment of the inventive method.

5 Claims, 3 Drawing Sheets

LOGARITHMIC COEFFICIENTS.
(AVERAGE LINKING COEFFICIENT, 12-MONTH PERIOD)

INVENTIVE COEFFICIENTS.
(AVERAGE LINKING COEFFICIENT, 12-MONTH PERIOD)

LOGARITHMIC COEFFICIENTS.
(NORMALIZED STANDARD DEVIATION (%), 12-MONTH PERIOD)

INVENTIVE COEFFICIENTS.
(NORMALIZED STANDARD DEVIATION (%), 12-MONTH PERIOD)

METHOD AND SYSTEM FOR MULTI-PERIOD PERFORMANCE ATTRIBUTION

CROSS-REFERENCE TO RELATED APPLICATION

The present application is a continuation-in-part of pending U.S. patent application Ser. No. 09/613,855, filed on Jul. 11, 2000, and assigned to the assignee of the present application.

TECHNICAL FIELD OF THE INVENTION

The present invention relates to methods for performing performance attribution to compare the returns of a financial portfolio against those of a benchmark, and attribute the relative performance to various effects resulting from active decisions by the portfolio manager. More particularly, the invention is an improved method for linking single-period attribution effects over multiple periods, using either an arithmetic or a geometric methodology.

BACKGROUND OF THE INVENTION

In performing performance attribution, the returns of a portfolio are compared against those of a benchmark, and the excess return (i.e., relative performance) is attributed to various effects resulting from active decisions by the portfolio managers. Performance attribution is a rich and complex topic, which can be viewed from many angles. There are a variety of conventional methods for performing attribution based on a single-period analysis. However, if performance is measured over an extended length of time, a single-period buy-and-hold analysis may lead to significant errors, especially for highly active portfolios. Therefore, it is imperative to link the single-period attribution effects over multiple periods in an accurate and meaningful way. The two basic approaches that have arisen for such linking are the arithmetic and geometric methodologies.

In arithmetic attribution, the performance of a portfolio relative to a benchmark is given by the difference $R-\bar{R}$, where $R$ and $\bar{R}$ refer to portfolio and benchmark returns, respectively. This relative performance, in turn, is decomposed sector by sector into attribution effects that measure how well the portfolio manager weighted the appropriate sectors and selected securities within the sectors. The sum of the attribution effects gives the performance, $R-R\bar{R}$.

In geometric attribution, by contrast, the relative performance is defined by the ratio $(1+R)(1+\bar{R})$. This relative performance is again decomposed sector by sector into attribution effects. In this case, however, it is the product of the attribution effects that gives the relative performance $(1+R)/(1+\bar{R})$. A recent example of both arithmetic and geometric attribution systems is described in Carino, "Combining Attribution Effects Over Time," *Journal of Performance Measurement*, Summer 1999, pp. 5–14 ("Carino").

An advantage of the arithmetic approach is that it is more intuitive. For instance, if the portfolio return is 21% and the benchmark return is 10%, most people regard the relative performance to be 11%, as opposed to 10%. An advantage of geometric attribution, on the other hand, is the ease with which attribution effects can be linked over time.

Carino describes one possible algorithm for linking attribution effects over time that results in a multi-period arithmetic performance attribution system. Furthermore, the result is residual free in that the sum of the linked attribution effects is exactly equal to the difference in linked returns. Carino discloses an arithmetic performance attribution method which determines portfolio relative performance over multiple time periods as a sum of terms of form $(R_t - \bar{R}_t)\beta_t$, where the index "t" indicates one time period, and where Carino's coefficients $\beta_t$ are $$\beta_t^{Carino} = \left[\frac{R - \bar{R}}{\ln(1+R) - \ln(1+\bar{R})}\right]\left(\frac{\ln(1+R_t) - \ln(1-\bar{R}_t)}{R_t - \bar{R}_t}\right).$$

In accordance with the present invention, new coefficients $(A+\alpha_t)$ to be defined below replace Carino's coefficients $\beta_t$ (sometimes referred to herein as conventional "logarithmic" coefficients). The inventive coefficients have a much smaller standard deviation than the conventional logarithmic coefficients. Reducing the standard deviation of the coefficients is important in order to minimize the distortion that arises from overweighting certain periods relative to others.

SUMMARY OF THE INVENTION

In a class of embodiments, the invention is an arithmetic method for determining portfolio relative performance over multiple time periods (t=1,2, . . . , T) as a sum of terms of form $(R_t - \bar{R}_t)(A+\alpha_t)$, where the coefficients $\alpha_t$ are defined as $$\alpha_1 = \left[\frac{R - \bar{R} - A\sum_{k=1}^{T}(R_k - \bar{R}_k)}{\sum_{k=1}^{T}(R_k - \bar{R}_k)^2}\right](R_t - \bar{R}_t).$$

The value of A is preferably $$A = \frac{1}{T}\left[\frac{(R-\bar{R})}{(1+R)^{1/T} - (1+\bar{R})^{1/T}}\right], \quad (R \neq \bar{R}).$$

or, for the special case $R=\bar{R}$:

$$A = (1+R)^{(T-1)/T}, \quad (R=\bar{R}),$$

where T is the total number of time periods.

The inventive coefficients $(A+\alpha_t)$ have smaller (and typically much smaller) standard deviation than the conventional logarithmic coefficients (in cases in which A has the preferred value), which reduces variation in the weights assigned to each time period relative to the other time periods in the attribution calculation.

In another class of embodiments, the invention is a geometric method for determining portfolio relative performance over multiple time periods (t=1,2, . . . , T) as $$\frac{1+R}{1+\bar{R}} = \prod_{t=1}^{T}\prod_{i=1}^{N}(1+I_{it}^G)(1+S_{it}^G),$$

where N is the number of sectors, $$1 + I_{it}^G = \left(\frac{1 + w_{it}r_{it}}{1 + w_{it}\bar{r}_{it}}\right)\Gamma_t^I$$

is an attribution effect (issue selection), $$1 + S_{it}^G = \left(\frac{1 + w_{it}\bar{r}_{it}}{1 + \bar{w}_{it}\bar{r}_{it}}\right)\left(\frac{1 + \bar{w}_{it}\bar{R}_t}{1 + w_{it}\bar{R}_t}\right)\Gamma_t^S,$$

is an attribution effect (sector selection), and the superscript G denotes "geometric". In preferred embodiments, the values of $\Gamma_t^I$ are $$\Gamma_t^I = \left[\frac{1 + R_t}{1 + \bar{R}_t} \prod_{j=1}^{N} \left(\frac{1 + w_{jt}\bar{r}_{jt}}{1 + w_{jt}r_{jt}}\right)\right]^{1/N}$$

and the values of $\Gamma_t^S$ are $$\Gamma_t^S = \left[\frac{1 + \tilde{R}_t}{1 + \bar{R}_t} \prod_{j=1}^{N} \left(\frac{1 + \bar{w}_{jt}\bar{r}_{jt}}{1 + w_{jt}\bar{r}_{jt}}\right)\left(\frac{1 + w_{jt}\bar{R}_t}{1 + \bar{w}_{jt}\bar{R}_t}\right)\right]^{1/N}.$$

In other embodiments, $$\Gamma_t^I = \Gamma_t^S = \left[\left(\frac{1 + R_t}{1 + \bar{R}_t}\right) \prod_{j=1}^{N} \left(\frac{(1 + \bar{w}_{jt}\bar{r}_{jt})(1 + w_{jt}\bar{R}_t)}{(1 + w_{jt}r_{jt})(1 + \bar{w}_{jt}\bar{R}_t)}\right)\right]^{\frac{1}{2N}}.$$

More generally, embodiments of the invention include geometric methods for determining portfolio relative performance over multiple time periods (t=1,2, . . . , T) as $$\frac{1 + R}{1 + \bar{R}} = \prod_{t=1}^{T} \prod_{i=1}^{N} \prod_{j=1}^{M} (1 + Q_{ijt}^G),$$

where the terms $1 + Q_{ijt}^G$ are attribution effects given by $$1 + Q_{ijt}^G = \prod_k \left(\frac{1 + a_{ijt}^k}{1 + b_{ijt}^k}\right) \Gamma_{ijt}^k,$$

where the terms $\Gamma_{ijt}^k$ are corrective terms that satisfy the constraint $$\prod_{ij} (1 + Q_{ijt}^G) = \frac{1 + R_t}{1 + \bar{R}_t}.$$

The attribution effects employed in preferred embodiments of the inventive geometric attribution method have a more natural form than those employed in conventional geometric attribution methods (such as the geometric attribution method of the above-cited Carino paper), since the inventive attribution effects are defined as ratios rather than exponentials. Further, the inventive definitions allow the geometric attribution method to be performed more accurately than the geometric attribution performed using the attribution effects as defined by Carino.

Other aspects of the invention are a computer system programmed to perform any embodiment of the inventive method, and a computer readable medium which stores code for implementing any embodiment of the inventive method.

BRIEF DESCRIPTION OF THE DRAWINGS

FIG. 1b is a contour plot of the average inventive coefficients resulting from the same simulations which determined FIG. 1a.

DETAILED DESCRIPTION OF THE PREFERRED EMBODIMENTS

Figure 1A:
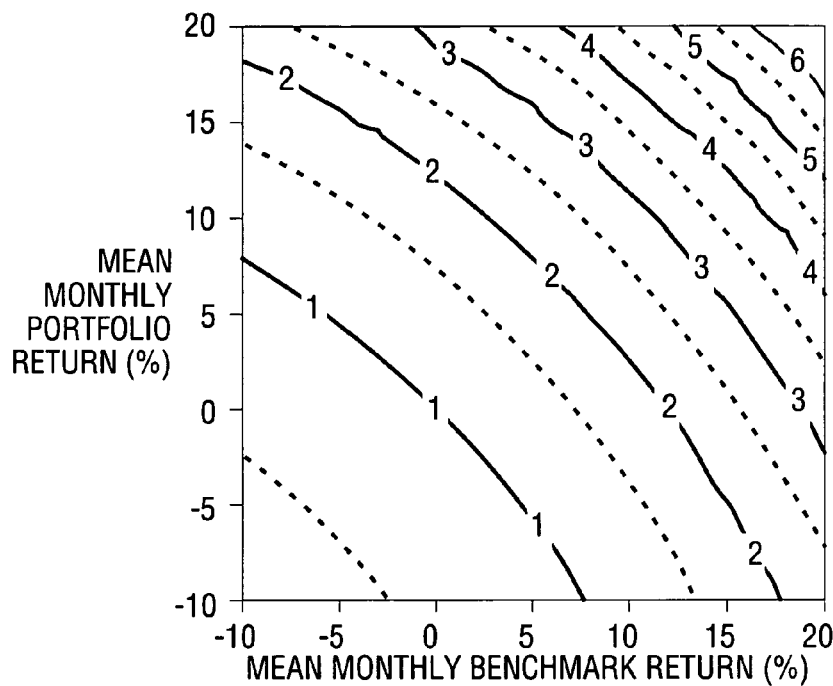
FIG. 1a is a contour plot of the average logarithmic coefficients, determined in accordance with the prior art, resulting from a set of simulations.

The arithmetic performance attribution method of the present invention is an improved approach to arithmetic linking over multiple periods. The methodology described herein is based on an optimal distribution of the residual among the different time periods. Such an approach minimizes the distortion that arises from overweighting certain time periods relative to others. The resulting attribution system is also residual free, robust, and completely general, so that performance can be linked without complication for any set of sector weights and returns.

The geometric performance attribution method of the present invention represents a fundamentally different definition for the geometric attribution effects, since the attribution effects are defined in terms of ratios rather than exponentials. This form, which is more natural, also results in an improved approximation over previous methods.

Single-Period Arithmetic Attribution

The portfolio return $R_t$ for a single period t can be written as the weighted average return over N sectors $$R_t = \sum_{i=1}^{N} w_{it}r_{it}, \quad (1)$$

where $w_{it}$ and $r_{it}$ are the portfolio weights and returns for sector i and period t, respectively. For the benchmark, the corresponding returns are $$\bar{R}_t = \sum_{i=1}^{N} \bar{w}_{it} \bar{r}_{it}, \quad (2)$$

with the overbar denoting the benchmark. The arithmetic measure of relative performance is therefore $$R_t - \bar{R}_t = \sum_{i=1}^{N} w_{it} r_{it} - \sum_{i=1}^{N} \bar{w}_{it} \bar{r}_{it}. \quad (3)$$

This difference can be rewritten as $$R_t - \bar{R}_t = \sum_{i=1}^{N} w_{it} r_{it} - \sum_{i=1}^{N} \bar{w}_{it} \bar{r}_{it} + \left[ \sum_{i=1}^{N} w_{it} \bar{r}_{it} - \sum_{i=1}^{N} w_{it} \bar{r}_{it} \right] + \left[ \sum_{i=1}^{N} \bar{w}_{it} \bar{R}_t - \sum_{i=1}^{N} w_{it} \bar{R}_t \right], \quad (4)$$

by noting that the terms in brackets are equal to zero. Combining terms, we obtain the desired result $$R_t - \bar{R}_t = \sum_{i=1}^{N} w_{it}(r_{it} - \bar{r}_{it}) + \sum_{i=1}^{N} (w_{it} - \bar{w}_{it})(\bar{r}_{it} - \bar{R}_t). \quad (5)$$

We interpret the terms in the first summation to be the issue selection $$I_{it}^{A} = w_{it}(r_{it} - \bar{r}_{it}), \quad (6)$$

with the superscript A denoting arithmetic.

The issue selection $I_{it}^{A}$ measures how well the portfolio manager picked overperforming securities in sector i during period t.

Similarly, the terms in the second summation of equation (5) we interpret to be the sector selection, $$S_{it}^{A} = (w_{it} - \bar{w}_{it})(\bar{r}_{it} - \bar{R}_t), \quad (7)$$

which measures the extent to which the manager overweighted the outperforming sectors. The active contribution $A_{it}^{A}$ is the sum of the issue selection $I_{it}^{A}$ and sector selection $S_{it}^{A}$:

$$A_{it}^{A} = I_{it}^{A} + S_{it}^{A}, \quad (8)$$

and gives the contribution of sector i to the performance for period t due to active management decisions.

The above relations allow us to write the net performance for period t as $$R_t - \bar{R}_t = \sum_{i=1}^{N} (I_{it}^{A} + S_{it}^{A}) = \sum_{i=1}^{N} A_{it}^{A}. \quad (9)$$

To summarize, the single-period relative performance has been fully decomposed into attribution effects at the sector level. These attribution effects, when summed over all sectors, give the total excess return for the period, $R_t - \bar{R}_t$.

Multiple-Period Arithmetic Attribution

It is desirable to extend the above analysis to the multiple-period case. The portfolio and benchmark returns linked over T periods are respectively given by $$1 + R = \prod_{t=1}^{T}(1 + R_t), \quad 1 + \bar{R} = \prod_{t=1}^{T}(1 + \bar{R}_t). \quad (10)$$

Just as we define the relative performance for the single-period case by the difference in single-period returns, it is natural to define the relative performance for the multiple-period case as the difference in linked returns, $R - \bar{R}$.

If the returns are small, then the relative performance is approximately given by $$R - \bar{R} \approx \sum_{t=1}^{T}(R_t - \bar{R}_t). \quad (11)$$

However, this approximation breaks down for large returns. A better approach is to multiply the right side of (11) by a contact factor A that takes into account the characteristic scaling which arises from geometric compounding:

$$R - \bar{R} \approx A \sum_{t=1}^{T}(R_t - \bar{R}_t). \quad (12)$$

An obvious possible choice for A is given by $$\frac{R - \bar{R}}{\sum_{t=1}^{T}(R_t - \bar{R}_t)}. \quad (13)$$

However, this naive solution is unacceptable because it does not necessarily reflect the characteristic scaling of the system. Furthermore, it may easily occur that the numerator and denominator of the above expression have opposite sign, in which case the entire linking process loses its underlying meaning.

The value of A that correctly describes such scaling can be found by substituting the mean geometric return $(1+R)^{1/T}-1$ for the single-period returns $R_t$, and similarly of the benchmark. Therefore, in preferred embodiments, A is given by $$A = \frac{1}{T}\left[\frac{(R - \bar{R})}{(1 + R)^{1/T} - (1 - \bar{R})^{1/T}}\right], \quad (R \neq \bar{R}). \quad (14)$$

Note that A satisfies the required property of being always positive. For the special case $R = \bar{R}$, it is easy to show that the above expression has limiting value $$A = (1+R)^{(T-1)/T}, \quad (R = \bar{R}). \quad (15)$$

In alternative embodiments, A is taken to have some other value. For example, A=1 or A=$[(1+R)(1+\bar{R})]^{1/2}$ in alternative embodiments.

Although (12) is a good approximation with A defined by equations (14) and (15), it still leaves a small residual for general sets of returns. However, we can introduce a set of corrective terms $\alpha_t$ that distribute the residual among the different periods so that the following equation exactly holds $$R - \bar{R} = \sum_{t=1}^{T} (A + \alpha_t)(R_t - \bar{R}_t). \quad (16)$$

The problem now reduces to calculating the $\alpha_t$. Our objective is to construct a solution for equation (16) that minimizes the distortion arising from voerweighting certain periods relative to others. In other words, the $\alpha_t$ should be chosen to be as small as possible. In order to find the optimal solution, we must minimize the function $$f = \sum_{t=1}^{T} \alpha_t^2, \quad (17)$$

subject to the constraint of equation (16). This is a standard problem involving Lagrange multipliers, and the optimal solution is given by $$\alpha_t = \left[ \frac{R - \bar{R} - A \sum_{k=1}^{T} (R_k - \bar{R}_k)}{\sum_{k=1}^{T} (R_k - \bar{R}_k)^2} \right] (R_t - \bar{R}_t). \quad (18)$$

With the $\alpha_t$ thus determined, the linking problem is solved. The optimized linking coefficients, denoted $\beta_t^{Vestek}$, are thus given by $$\beta_t^{Vestek} = A + \alpha_t, \quad (19)$$

with A defined in equations (14) and (15), and $\alpha_t$ given by equation (18). Substituting equation (9) and equation (19) into equation (16) we obtain $$R - \bar{R} = \sum_{t=1}^{T} \sum_{i=1}^{N} \beta_t^{Vestek} (I_{it}^A + S_{it}^A). \quad (20)$$

Observe that our result is fully additive, so that the total performance is defined as a sum of attribution effects, each summed over sectors and time periods. Furthermore, there is no unexplained residual.

The inventor has determined that if one chooses the value of A to be the value determined by equation (14) (or equation (15), if R=$\bar{R}$), the standard deviation of the inventive coefficients of equation (19) is less than that for the logarithmic coefficients disclosed in the above-cited paper by Carino, namely the $\beta_t^{Carino}$ of equation (21), in all simulations performed. Thus, this choice for the value of A guarantees smaller standard deviation among the coefficients $\beta_t^{Vestek}$ than among the logarithmic coefficients taught by Carino.

It is interesting to compare the inventive weighting coefficients $\beta_t^{Vestek}$ of equation (19) to the logarithmic coefficients disclosed by Carino:

$$\beta_t^{Carino} = \left[ \frac{R - \bar{R}}{\ln(1+R) - \ln(1+\bar{R})} \right] \left( \frac{\ln(1+R_t) - \ln(1+\bar{R}_t)}{R_t - \bar{R}_t} \right) \quad (21)$$

The logarithmic coefficients (21) are similar to their optimized counterparts (19) in that both lead to residual-free linking. However, the logarithmic coefficients tend to overweight periods with lower-than-average returns, and to underweight those with higher-than-average returns. This appears to be an artifact of the linking algorithm, and not to be grounded in any economic principle. The optimized coefficients, by contrast, tend to weight each period as evenly as possible.

Figure 1B:
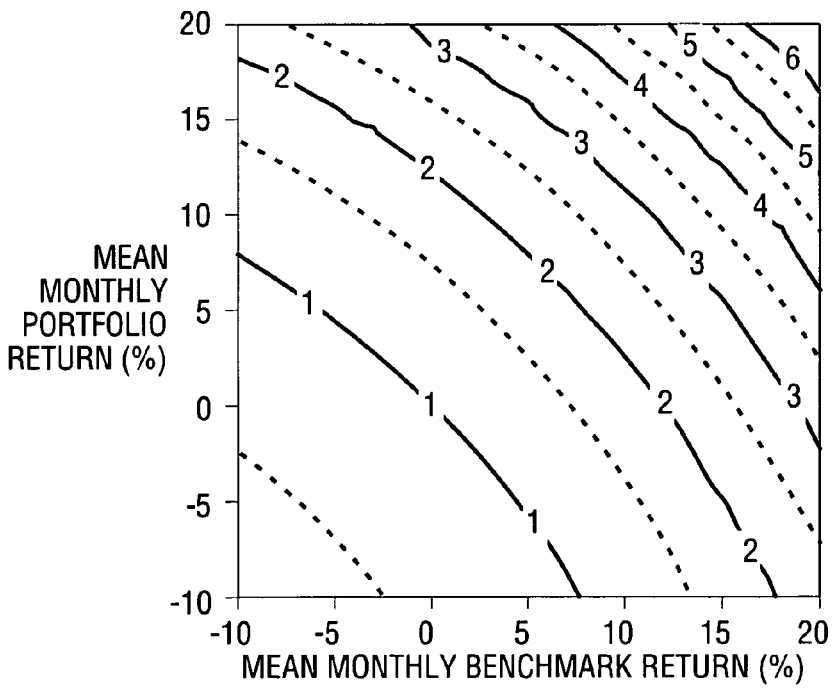

We conducted a more detailed analysis comparing the inventive coefficients and the conventional logarithmic coefficients, using computational simulations linking single-month attribution effects over a twelve-month period. The portfolio and benchmark returns were drawn from normal distributions, with the standard deviation set equal to the absolute value of the mean return. The portfolio and benchmark distributions were kept fixed for the twelve-month period, and each data point was calculated by averaging the linking coefficients over 1000 sample paths drawn from the same fixed distributions. The mean monthly returns were then varied from −10% to +20%, in order to obtain an understanding of the global behavior of the linking coefficients. Typical annual returns varied from −70% on the low end to +800% on the high end. FIGS. 1a and 1b show results of the simulations, with FIG. 1a being a contour plot of the average logarithmic coefficients and FIG. 1b being a contour plot of the average inventive coefficients. In both cases, the coefficients increase from an average of less than 0.5 for the smallest returns to more than 6.0 for the largest returns. Furthermore, we see that for any combination of portfolio and benchmark returns, the average coefficient is virtually identical in both approaches. Evidently, the reason for this similarity is that the coefficients in the logarithmic algorithm also correctly account for the scaling properties.

A more interesting study, however, is to compare the standard deviation for both sets of coefficients for the same set of returns used in FIGS. 1a and 1b. We first calculate for a single twelve-month period $\hat{\sigma}$, the percent standard deviation of the linking coefficients normalized by the average linking coefficient $<\beta>$ for that twelve-month period, $$\hat{\sigma} = 100 \frac{\sqrt{\langle \beta^2 \rangle - \langle \beta \rangle^2}}{\langle \beta \rangle}. \quad (22)$$

Figure 2A:
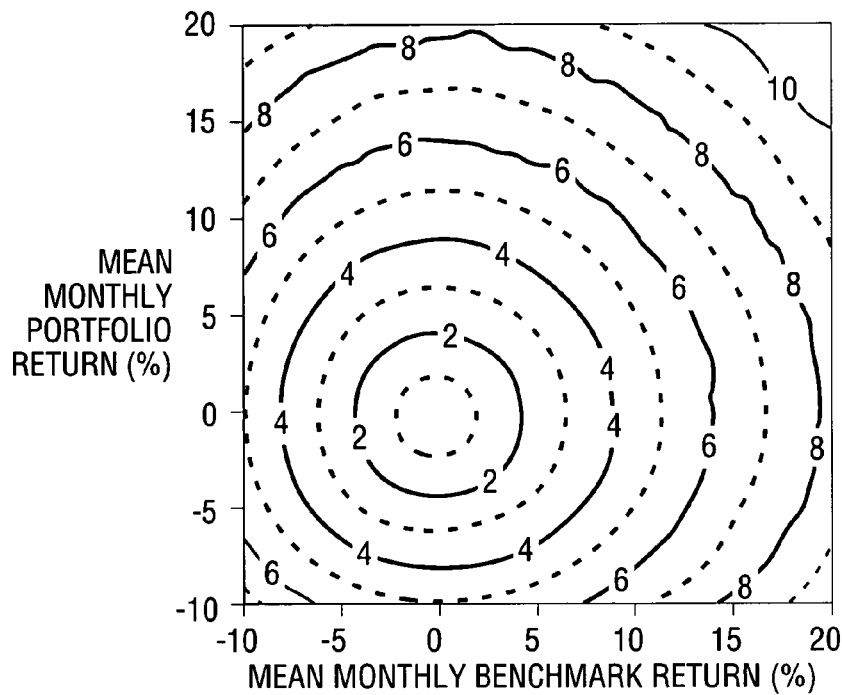
FIG. 2a is plot of normalized standard deviation for the conventional logarithmic coefficients, assuming the same set of distribution that were assumed to generate FIGS. 1a and 1b.
Figure 2B:
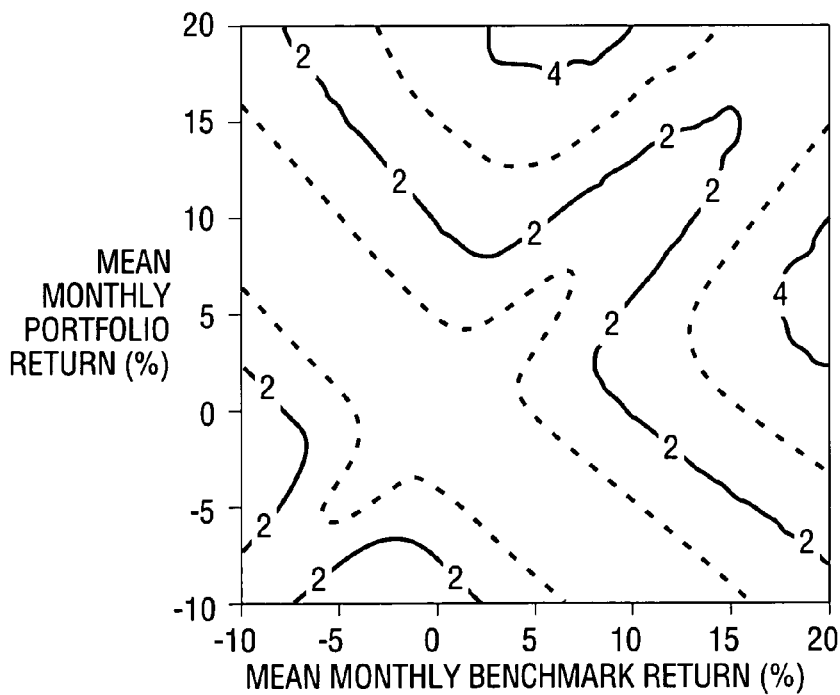
FIG. 2b is plot of normalized standard deviation for the inventive coefficients, assuming the same set of distributions that were assumed to generate FIGS. 1a and 1b.

We then average $\hat{\sigma}$ over 1000 sample paths in order to obtain a good estimate of the average normalized standard deviation of the linking coefficients. The resulting contour plots are presented in FIGS. 2a and 2b. We observe fundamentally distinct behavior for the two cases. For the logarithmic coefficients, the normalized standard deviation increases in concentric circles about the origin, rising to over 10% for the largest returns considered here. By contrast, the inventive coefficients exhibit valleys of extremely low standard deviation extending along the directions R=±$\bar{R}$. This property of the inventive coefficients is very appealing because, in the usual case, portfolio returns can be expected to at least roughly track the benchmark returns. In other words, in the usual case, the inventive coefficients have a much smaller standard deviation than the conventional logarithmic coefficients.

Although the results of FIGS. 1a, 1b, 2a, and 2b were obtained for a twelve-month period with specific distributions, the inventor has conducted extensive simulations with different periods and different distributions and has found that the results are entirely consistent with those shown in FIGS. 1a, 1b, 2a, and 2b.

It is natural to ask what kinds of differences might arise in practice between the two sets of linking coefficients. In Table 1 we present a hypothetical set of portfolio and benchmark returns for a six-month period, together with the resulting linking coefficients for the logarithmic and optimized cases. We note that the standard deviation of the optimized coefficients is very small, with the coefficients ranging from roughly 1.41 to 1.42. For the logarithmic case, on the other hand, the coefficients range from 1.26 to 1.54. The linked portfolio and benchmark returns for this example are 64.37% and 39.31%, respectively, for an excess return of 25.06%. In Table 1 we also decompose the single-period relative performance into issue selection $I_t^A$ and sector selection $S_t^A$, where these attribution effects represent the total summed over all sectors. The values were specifically chosen for illustrative purposes with the average single-period issue selection and sector selection being equal. Applying the logarithmic linking algorithm, we find that the linked issue selection is 10.88%, and that the linked sector selection is 14.18%. Using the optimized coefficients, the corresponding values are 12.52% and 12.54%, respectively. In both cases, the issue selection and sector selection add to give the correct relative performance of 25.06%, so that there is no residual in either method. However, the optimized approach more accurately reflects the fact that, on average, the issue selection and sector selection were equal.

TABLE 1

Comparison of the logarithmic ($\beta_t^{Carino}$) and optimized ($\beta_t^{Veslek}$) coefficients for a hypothetical six-month period. Portfolio and benchmark returns are given by $R_t$ and $\bar{R}_t$, respectively. Also presented are the single-period issue selection $I_t^A$ and sector selection $S_t^A$.

| Period t | $R_t$ (%) | $\bar{R}_t$ (%) | $\beta_t^{Carino}$ | $\beta_t^{Vestek}$ | $I_t^A$ (%) | $S_t^A$ (%) |
|---|---|---|---|---|---|---|
| 1 | 10.0 | 5.0 | 1.409496 | 1.412218 | 2.0 | 3.0 |
| 2 | 25.0 | 15.0 | 1.263177 | 1.410606 | 9.0 | 1.0 |
| 3 | 10.0 | 20.0 | 1.318166 | 1.417053 | −2.0 | −8.0 |
| 4 | −10.0 | 10.0 | 1.520015 | 1.420276 | −13.0 | −7.0 |
| 5 | 5.0 | −8.0 | 1.540243 | 1.409639 | 3.0 | 10.0 |
| 6 | 15.0 | −5.0 | 1.447181 | 1.407383 | 10.0 | 10.0 |

Single-Period Geometric Attribution

In the geometric approach, the relative performance for period t is given by the ratio $$\frac{1+R_t}{1+\bar{R}_t}. \tag{23}$$

One of the nice features of geometric attribution is the natural way in which the attribution effects link over multiple periods. In order to fully exploit this characteristic, however, the geometric attribution system should exactly mirror the arithmetic system. In other words, just as attribution effects are combined arithmetically in terms of summations, they should be combined geometrically in terms of products.

Carino defines the geometric attribution effects in terms of an exponential function of the corresponding arithmetic attribution effect multiplied by a corrective factor $k_t$. For instance, using the Carino approach, the geometric issue selection would be defined by $$1+I_{it}^{G,Carino}=\exp(k_t I_{it}^A), \tag{24}$$

where $I_{it}^A$ is given by equation (6), $k_t$ is give by $$k_t = \left(\frac{\ln(1+R_t) - \ln(1+\bar{R}_t)}{R_t - \bar{R}_t}\right), \tag{25}$$

and the superscript G denotes "geometric." Similarly, the geometric sector selection in the Carino picture is $$1+S_{it}^{G,Carino}=\exp(k_t S_{it}^A), \tag{26}$$

with $S_{it}^A$ given by equation (7).

However, just as geometric relative performance is defined in terms of a ratio, we believe it is more natural to define the geometric attribution effects also in terms of ratios. With this in mind, we define the geometric issue select $I_{it}^{G,Vestek}$ for sector i and period t by $$1 + I_{it}^{G,Vestek} = \left(\frac{1+w_{it}r_{it}}{1+\bar{w}_{it}\bar{r}_{it}}\right)\Gamma_t. \tag{27}$$

$\Gamma_t$, which plays a role equivalent to Carino's $k_t$, is given by $$\Gamma_t = \left[\left(\frac{1+R_t}{1+\bar{R}_t}\right)\prod_{j=1}^{N}\frac{(1+\bar{w}_{jt}\bar{r}_{jt})(1+w_{jt}\bar{R}_t)}{(1+w_{jt}r_{jt})(1+\bar{w}_{jt}\bar{R}_t)}\right]^{\frac{1}{2N}}. \tag{28}$$

Similarly, we define the geometric sector selection as $$1+S_{it}^{G,Vestek} = \left(\frac{1+w_{it}\bar{r}_{it}}{1+\bar{w}_{it}\bar{r}_{it}}\right)\left(\frac{1+\bar{w}_{jt}\bar{R}_{jt}}{1+w_{jt}\bar{R}_{jt}}\right)\Gamma_t. \tag{29}$$

It is easy to verify that for the case of small returns, $\Gamma_t$ approaches unity and that $I_{it}^{G,Vestek}$ and $S_{it}^{G,Vestek}$ approach their arithmetic counterparts, $I_{it}^A$ and $S_{it}^A$, respectively. This property, which is shared by the Carino attribution effects, is required in order to preserve the intrinsic meaning from the familiar arithmetic definitions.

The total geometric issue selection $I_t^{G,Vestek}$ for period t is defined in terms of the product of the contributions over all sectors $$1+I_t^{G,Vestek} = \prod_{i=1}^{N}(1+I_{it}^{G,Vestek}). \tag{30}$$

The total geometric sector selection $S_t^{G,Vestek}$ for period t is given by the product $$1 + S_t^{G,Vestek} = \prod_{i=1}^{N} \left(1 + S_{it}^{G,Vestek}\right). \tag{31}$$

The geometric active contribution $A_{it}^{G,Vestek}$ for sector i and period t is $$1 + A_{it}^{G,Vestek} = (1 + I_{it}^{G,Vestek})(1 + S_{it}^{G,Vestek}), \tag{32}$$

in analogy with the arithmetic case. Similarly, the total geometric active contribution $A_t^{G,Vestek}$ for period t is given by $$1 + A_t^{G,Vestek} = \prod_{i=1}^{N} \left(1 + I_{it}^{G,Vestek}\right)\left(1 + S_{it}^{G,Vestek}\right) = \frac{1+R}{1+\overline{R}_t}. \tag{33}$$

Equation (33) is the fully geometric analog of equation (9).

Multiple-Period Geometric Attribution

One of the strong features of geometric attribution is the ease with which linking can be accomplished over multiple time periods. The linked relative performance follows immediately from the single-period definitions, $$\frac{1+R}{1+\overline{R}} = \frac{\prod_{t=1}^{T}(1+R_t)}{\prod_{t=1}^{T}(1+\overline{R}_t)} = \prod_{t=1}^{T}\left(1 + I_t^{G,Vestek}\right)\left(1 + S_t^{G,Vestek}\right). \tag{34}$$

This can also be written as $$\frac{1+R}{1+\overline{R}} = \prod_{t=1}^{T}\prod_{i=1}^{N}\left(1 + I_{it}^{G,Vestek}\right)\left(1 + S_{it}^{G,Vestek}\right). \tag{35}$$

where $I_{it}^{G,Vestek}$ is defined in equation (27) and $S_{it}^{G,Vestek}$ is defined in equation (29). Equation (35) is the fully geometric analog of equation (20). In the Carino approach, the corresponding result is given by $$\frac{1+R}{1+\overline{R}} = \prod_{t=1}^{T}\prod_{i=1}^{N}\left(1 + I_{it}^{G,Carino}\right)\left(1 + S_{it}^{G,Carino}\right), \tag{36}$$

with $I_{it}^{G,Carino}$ and $S_{it}^{G,Carino}$ given by equations (24) and (26) respectively.

The attribution effects defined in preferred embodiments of the inventive geometric attribution method (including the embodiment to be described with reference to equations (42)–(49)) have more natural form than the conventional attribution effects (such as those employed in the geometric attribution method of the above-cited Carino paper), since the inventive attribution effects are defined as ratios rather than exponentials.

Further, the inventive attribution effects allow the inventive geometric attribution method to be performed more accurately than geometric attribution performed using the Carino approach. This can be established quantitatively by recognizing that the basic approximation involved is found by setting the corrective factors $k_t$ and $\Gamma_t$ equal to unity. In other words, the approximation involved in the Carino method is $$\frac{1+R}{1+\overline{R}} \approx \exp(R_t - \overline{R}_t). \tag{37}$$

Therefore, the corresponding error term resulting from geometric attribution using the Carino method is $$\varepsilon_{Carino} = \frac{\exp(R_t - \overline{R}_t) - (1+R_t)/(1+\overline{R}_t)}{(1+R_t)/(1+\overline{R}_t)}. \tag{38}$$

For the inventive geometric method, the basic approximation ($\Gamma_t=1$) is $$\frac{1+R}{1+\overline{R}} \approx \prod_{i=1}^{N} \frac{(1+w_{it}r_{it})(1+\overline{w}_{it}\overline{R}_t)}{(1+\overline{w}_{it}\overline{r}_{it})(1+w_{it}\overline{R}_t)}. \tag{39}$$

The corresponding error term in the inventive approach is therefore $$\varepsilon_{Vestek} = \Gamma_t^{-2N} - 1. \tag{40}$$

In order to obtain an analytic expression for equation (40), we assume that the benchmark returns are equal to zero ($\overline{r}_{it}=0$), and that the portfolio weights and returns are evenly distributed (i.e., $r_{kt}=r_{jt}$ for all k and j, and $w_{jt}=1/N$ for all j). In this special case the error of the approximation is given by $$\varepsilon_{Vestek} = \frac{(1+R_t/N)^N - (1+R_t)}{1+R_t}, \tag{41}$$

where N is the number of sectors. With these expressions for the error terms, it is easy to establish that the worst-case error resulting from the inventive attribution effects (which occurs in the limit as N approaches infinity) is equal to the error resulting from the Carino definitions. Monte Carlo simulations also establish that the error resulting from the inventive attribution effects for general sets of weights and returns is consistently smaller than the error resulting from the Carino definitions.

The general idea behind the geometric attribution methodology presented herein is that the attribution effects should be defined in terms of the appropriate ratio multiplied by a small corrective factor that ensures that the product of all attribution effects over all sectors gives exactly the geometric relative performance. Within this constraint, there is considerable freedom in choosing the corrective factors. For instance, another good definition for the geometric issue selection is $$1 + I_{it}^G = \frac{1 + w_{it} r_{it}}{1 + w_{it} \tilde{r}_{it}} \Gamma_t^I. \quad (42)$$

The aggregate geometric issue selection, found by multiplying over all sectors, is $$1 + I_t^G = \prod_{i=1}^{N} (1 + I_{it}^G) = \frac{1 + R_t}{1 + \tilde{R}_t}, \quad (43)$$

where $\tilde{R}_t$ is the semi-notional return defined by $$\tilde{R}_t = \sum_{i=1}^{N} w_{it} \tilde{r}_{it}. \quad (44)$$

Therefore, $\Gamma_t^I$ is given by $$\Gamma_t^I = \left[ \frac{1 + R_t}{1 + \tilde{R}_t} \prod_{j=1}^{N} \left( \frac{1 + w_{jt} \tilde{r}_{jt}}{1 + w_{jt} r_{jt}} \right) \right]^{1/N}. \quad (45)$$

Similarly, we define our geometric sector selection as $$1 + S_{it}^G = \left( \frac{1 + w_{it} \tilde{r}_{it}}{1 + \overline{w}_{it} \tilde{r}_{it}} \right) \left( \frac{1 + \overline{w}_{it} \overline{R}_t}{1 + w_{it} \overline{R}_t} \right) \Gamma_t^S. \quad (46)$$

The product over all sectors is given by $$1 + S_t^G = \prod_{i=1}^{N} (1 + S_{it}^G) = \frac{1 + \tilde{R}_t}{1 + \overline{R}_t}, \quad (47)$$

so that $\Gamma_t^S$ is given by $$\Gamma_t^S = \left[ \frac{1 + R_t}{1 + \tilde{R}_t} \prod_{j=1}^{N} \left( \frac{1 + \overline{w}_{jt} \tilde{r}_{jt}}{1 + w_{jt} r_{jt}} \right) \left( \frac{1 + w_{jt} \overline{R}_t}{1 + \overline{w}_{jt} \overline{R}_t} \right) \right]^{1/N}. \quad (48)$$

Combining equations (A2) and (A6), we obtain $$\frac{1 + R_t}{1 + \tilde{R}_t} = \prod_{j=1}^{N} (1 + I_{it}^G)(1 + S_{it}^G) = (1 + I_t^G)(1 + S_t^G). \quad (49)$$

Clearly, the above results can be generalized. Let the excess return for period t, $R_t - \overline{R}_t$, be decomposed into arithmetic attribution effects $Q_{ijt}^A$, where i denotes the sector, j denotes the attribution effect, and the superscript A denotes arithmetic. Hence, $$R_t - \overline{R}_t = \sum_{ij} Q_{ijt}^A. \quad (50)$$

The attribution effect can be written as a sum of differences, $$Q_{ijt}^A = \sum_k a_{ijt}^k - \sum_k b_{ijt}^k. \quad (51)$$

For instance, if $Q_{ijt}^A$ is issue selection, then k=1,1 and $a_{ijt}^1 = w_{it} r_{it}$, and $b_{ijt}^1 = w_{it} \tilde{r}_{it}$. The corresponding geometric attribution effect can now be written as $$1 + Q_{ijt}^G = \prod_k \left( \frac{1 + a_{ijt}^k}{1 + b_{ijt}^k} \right) \Gamma_{ijt}^k. \quad (52)$$

The corrective terms $\Gamma_{ijt}^k$ must satisfy the constraint $$\prod_{ij} (1 + Q_{ijt}^G) = \frac{1 + R_t}{1 + \overline{R}_t}. \quad (53)$$

Figure 3:
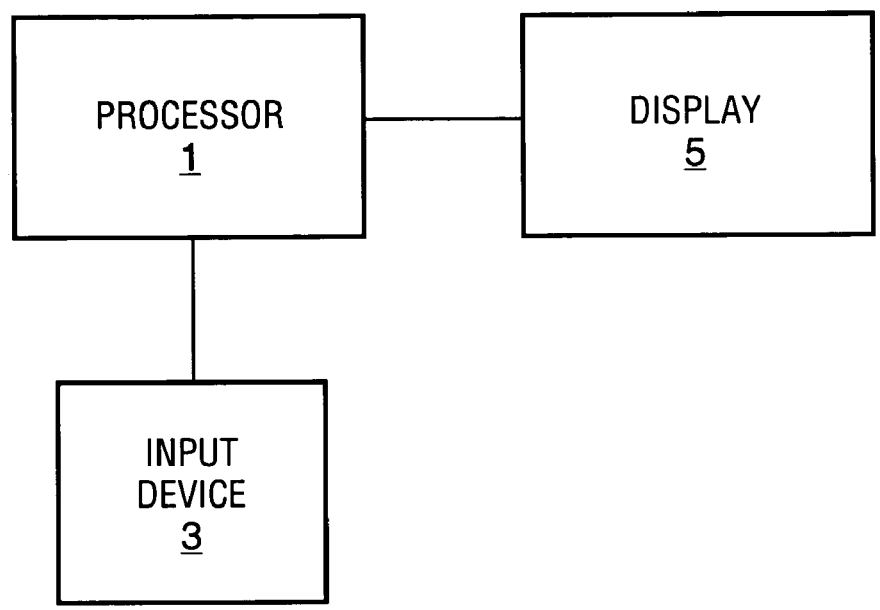
FIG. 3 is a block diagram of a computer system for implementing any embodiments of the inventive method.
Figure 4:
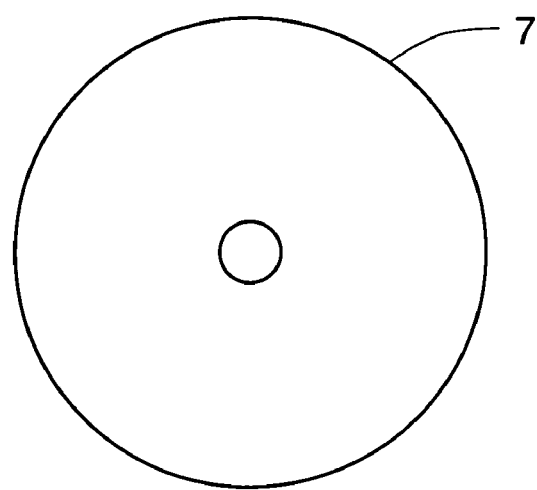
FIG. 4 is an elevational view of a computer readable optical disk on which is stored computer code for implementing any embodiment of the inventive method.

The computer system of FIG. 3 includes processor 1, input device 3 coupled to processor 1, and display device 5 coupled to processor 1. Processor 1 is programmed to implement the inventive method in response to instructions and data entered by user manipulation of input device 3. Computer readable optical disk 7 of FIG. 4 has computer code stored thereon. This code is suitable for programming processor 1 to implement an embodiment of the inventive method.

Although the invention has been described in connection with specific preferred embodiments, various modifications of and variations on the described methods and apparatus of the invention will be apparent to those skilled in the art without departing from the scope and spirit of the invention. For example, in variations of the above-described embodiments, the effects of currency fluctuations in a global portfolio are accounted for.

What is claimed is:

1. An arithmetic performance attribution method for determining portfolio performance, relative to a benchmark, over multiple time periods t, where t varies from 1 to T, comprising the steps of:

(a) determining coefficients $(A + \alpha_t)$, where the values $\alpha_t$ are defined as $$\alpha_t = \left[ \frac{R - \overline{R} - A \sum_{k=1}^{T} (R_k - \overline{R}_k)}{\sum_{k=1}^{T} (R_k - \overline{R}_k)^2} \right] (R_t - \overline{R}_t),$$

where A has any predetermined value, $R_t$ is a portfolio return for period t, $\overline{R}_t$ is a benchmark return for period t, R is determined by $$R = \left[\prod_{t=1}^{T}(1+R_t)\right] - 1,$$

and $\overline{R}$ is determined by $$\overline{R} = \left[\prod_{t=1}^{T}(1+\overline{R}_t)\right] - 1;$$

and (b) determining the portfolio performance as $$R - \overline{R} = \prod_{t=1}^{T}(A + \alpha_t)(R_t - \overline{R}_t).$$

2. The method of claim 1, wherein A is $$A = \frac{1}{T}\left[\frac{(R-\overline{R})}{(1+R)^{1/T} - (1+\overline{R})^{1/T}}\right],$$

where $R \neq \overline{R}$, or for the special case $R = \overline{R}$:

$$A = (1+R)^{(T-1)/T}.$$

3. The method of claim 1, wherein A=1.

4. The method of claim 1, wherein step (b) is performed by determining the portfolio performance as $$R - \overline{R} = \sum_{t=1}^{T}\sum_{i=1}^{N}(A + \alpha_t)(I_{it}^A + S_{it}^A),$$

where $I_{it}^A$ is an issue selection for sector i and period t, and $S_{it}^A$ is a sector selection for sector i and period t.

5. A geometric performance attribution method for determining portfolio performance, relative to a benchmark, over multiple time periods t, where t values from 1 to T, comprising the steps of:

determining attribution effects for issue selection $(1+I_{it}^G)$ given by $$1 + I_{it}^G = \frac{1 + w_{it}r_{it}}{1 + w_{it}\overline{r}_{it}}\Gamma_t^I,$$

and determining attribution effects for sector selection $(1+S_{it}^G)$ given by $$1 + S_{it}^G = \left(\frac{1 + w_{it}\overline{r}_{it}}{1 + \overline{w}_{it}\overline{r}_{it}}\right)\left(\frac{1 + \overline{w}_{it}\overline{R}_t}{1 + w_{it}\overline{R}_t}\right)\Gamma_t^S,$$

where $r_{jt}$ is a portfolio return for sector j for period t, $\overline{r}_{jt}$ is a benchmark return for sector j for period t, $w_{jt}$ is a weight for $r_{jt}$, $\overline{w}_{jt}$ is a weight for $\overline{r}_{jt}$, R is determined by $$R = \left[\prod_{t=1}^{T}(1+R_t)\right] - 1$$

and $\overline{R}$ is determined by $$\overline{R} = \left[\prod_{t=1}^{T}(1+\overline{R}_t)\right] - 1;$$

and determining the portfolio performance as $$\frac{1+R}{1+\overline{R}} = \prod_{t=1}^{T}\prod_{i=1}^{N}(1+I_{it}^G)(1+S_{it}^G).$$

* * * * *